(12) United States Patent
Kanagarathinam et al.

(10) Patent No.: US 12,192,840 B2
(45) Date of Patent: Jan. 7, 2025

(54) METHOD AND SYSTEM FOR NETWORK HANDOVER ON TRANSPORT LAYER

(71) Applicant: Samsung Electronics Co., Ltd., Suwon-si (KR)

(72) Inventors: Madhan Raj Kanagarathinam, Bengaluru (IN); Chounjong Nam, Suwon-si (KR); Gaurav Sinha, Bengaluru (IN); Gunjan kumar Choudhary, Bengaluru (IN); Karthikeyan Arunachalam, Bengaluru (IN); Sunghee Lee, Suwon-si (KR); Sujith Rengan Jayaseelan, Bengaluru (IN); Dronamraju Siva Sabareesh, Bengaluru (IN); Harikrishnan Natarajan, Bengaluru (IN); Jaheon Gu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 16/994,344

(22) Filed: Aug. 14, 2020

(65) Prior Publication Data

US 2021/0092657 A1    Mar. 25, 2021

(30) Foreign Application Priority Data

Aug. 15, 2019 (IN) .............................. 201941033010
Aug. 13, 2020 (IN) ............................. 2019-41033010

(51) Int. Cl.
*H04W 36/04* (2009.01)
*H04L 69/16* (2022.01)
(Continued)

(52) U.S. Cl.
CPC ........... *H04W 36/04* (2013.01); *H04L 69/162* (2013.01); *H04W 36/0079* (2018.08);
(Continued)

(58) Field of Classification Search
None
See application file for complete search history.

(56) References Cited

U.S. PATENT DOCUMENTS 6,711,621 B1    3/2004  Mitra et al.
8,190,960 B1 *  5/2012  Bahadur ................ H04L 12/56
                                                   714/751
(Continued)

FOREIGN PATENT DOCUMENTS

KR   10-2019-0006774 A    1/2019
WO       2016/126174 A1    8/2016
WO       2019/147970 A1    8/2019

OTHER PUBLICATIONS

Intellectual Property India "Examination report under sections 12 & 13 of the Patents Act" issued Nov. 17, 2021, in connection with Indian Patent Application No. 201941033010, 7 pages.
(Continued)

*Primary Examiner* — Pamit Kaur

(57) ABSTRACT

Disclosed herein is a method and network handover system for handling a data session in a user equipment (UE). The method comprises initiating a data session of at least one application from a plurality of applications with a first communication interface using a first socket of the UE having a first socket file descriptor (SOCKFD) for the data session, detecting a deterioration in a network connection of the first communication interface, identifying a second communication interface, establishing a second socket having a second SOCKFD associated with the second communication interface and migrating the data session from the first communication interface to the second communication interface by mapping the first SOCKFD corresponding to the first socket to the second SOCKFD corresponding to the second socket.

18 Claims, 12 Drawing Sheets

(51) Int. Cl.
  *H04W 36/00* (2009.01)
  *H04W 36/36* (2009.01)
  *H04W 80/06* (2009.01)
  *H04W 36/14* (2009.01)
  *H04W 36/30* (2009.01)

(52) U.S. Cl.
  CPC ........... *H04W 36/36* (2013.01); *H04W 80/06* (2013.01); *H04W 36/144* (2023.05); *H04W 36/304* (2023.05)

(56) References Cited

U.S. PATENT DOCUMENTS

| | | | |
|---|---|---|---|
| 8,886,195 | B2 | 11/2014 | Srinivasan et al. |
| 9,473,598 | B2 | 10/2016 | Kashyap |
| 9,497,767 | B2 | 11/2016 | Hata et al. |
| 9,560,557 | B2 | 1/2017 | Anthony, Jr. et al. |
| 9,648,528 | B2 | 5/2017 | Lee et al. |
| 10,172,028 | B2 | 1/2019 | Dhanabalan et al. |
| 10,237,798 | B2 | 3/2019 | Kotecha et al. |
| 10,721,734 | B2 | 7/2020 | Xu et al. |
| 2003/0115357 | A1* | 6/2003 | Chu ................... H04L 69/162 709/230 |
| 2009/0157882 | A1* | 6/2009 | Kashyap ............ H04L 67/1001 709/227 |
| 2013/0065588 | A1* | 3/2013 | Rodbro ................ H04W 36/14 455/436 |
| 2017/0070923 | A1 | 3/2017 | Li et al. |
| 2017/0156086 | A1 | 6/2017 | Tomici et al. |
| 2018/0063853 | A1* | 3/2018 | Szabo .................. H04W 72/56 |
| 2018/0084597 | A1 | 3/2018 | Kanagarathinam et al. |
| 2020/0065076 | A1* | 2/2020 | Howlett .................... G06F 8/75 |
| 2020/0128449 | A1* | 4/2020 | Faus Gregori .... H04W 36/0022 |
| 2020/0137653 | A1 | 4/2020 | Park et al. |

OTHER PUBLICATIONS

International Search Report dated Nov. 20, 2020 in connection with International Patent Application No. PCT/KR2020/010895, 3 pages.
Written Opinion of the International Searching Authority dated Nov. 20, 2020 in connection with International Patent Application No. PCT/KR2020/010895, 4 pages.
Kimura et al., "A Session-Based Mobile Socket Layer for Disruption Tolerance on the Internet", IEEE Transactions on Mobile Computing, vol. 13, No. 8, Aug. 1, 2014, 13 pages.
Velazquez-Garcia et al., "SOCKMAN: Socket Migration for Multimedia Applications", Jun. 26-28, 2013, 8 pages.
Supplementary European Search Report dated Apr. 26, 2022 in connection with European Patent Application No. 20 85 1868, 13 pages.
The First Office Action dated Nov. 10, 2023, in connection with Chinese Patent Application No. 202080041561.X, 14 pages.

* cited by examiner

METHOD AND SYSTEM FOR NETWORK HANDOVER ON TRANSPORT LAYER

CROSS-REFERENCE TO RELATED APPLICATIONS

This application is based on and claims priority under 35 U.S.C. § 119(a) to Indian Patent Application No. 201941033010 filed on Aug. 15, 2019, and Indian Patent Application No. 201941033010 filed on Aug. 13, 2020, in the Indian Intellectual Property Office, the disclosures of which are herein incorporated by reference in their entirety.

BACKGROUND

1. Field

The present subject matter is, in general, related to handover in cellular networks. Particularly, but not exclusively, the present disclosure relates to a method and network handover system for handling a data session in a user equipment (UE).

2. Description of Related Art

Handover process is of major importance within any cellular telecommunications network. It is necessary to ensure that the handover is performed reliably and without disruption to any ongoing data transfer or calls. In particular, the handover is an inevitable process in 5G cellular networks, since the 5G cellular network is coupled with Wi-Fi in most of the areas and is expected to work hand-in-hand with the mobile network. Therefore, a frequent handover between Wi-Fi and the mobile network may be expected in 5G networks. Also, pre-6G cellular networks foresee ubiquitous ultra-broadband with faster seamless handover to Wi-Fi backhaul.

Moreover, the transmission control protocol/user datagram protocol (TCP/UDP) is network address sensitive and any change in the internet protocol (IP) or the route might create disconnection from a previous session. On the other hand, hypertext transfer protocol (HTTP) may use "range request" concept to recover the data, because of which the "download" recovers after every Wi-Fi-to-mobile network handover. However, the "download" process is not the widely used option for the users. Consequently, other widely used activities such as gaming, chat and messaging use either encrypted TCP/UDP or their own application level protocol. This results in connectivity disconnections during network handover.

One of the existing handover methods provided performing handover at application layer, independent of the path (except in transport layer security TLS REUSE) and requires no hardware changes. However, this method cannot be applied on any plain connection, that is, in real-time data transmission scenarios such as gaming. Also, handover at the application layer may make the handover application specific and may not have an impact on the entire operation of the user equipment (UE).

Another existing method of handover suggests performing handover on the transport layer and uses multipath transmission control protocol (MPTCP), independent of the application and the data path. However, this method requires server-side changes. That is, the server must support MPTCP. But, most of the servers may not support the MPTCP. Also, these methods may be best suited only for selected protocols like TCP. Other protocols such as UDP, stream control transmission protocol (STCP) and internet control message protocol (ICMP) may not be supported by the handover in the transport layer.

On the other hand, performing handover at the lower layers may be more efficient than above methods. For example, if the handover is performed on layer 3 (i.e., the network layer), the transport layer and the application layer may be enriched with seamless experience. Even then, handover at the lower layers may not support heterogeneous handover. That is, the heterogeneous handover may be possible only if long term evolution (LTE) and Wi-Fi have same path deployed by the same network operator. Also, handover on the lower layers may require hardware level changes.

Thus, there is need for an efficient and reliable network handover method.

The information disclosed in this background of the disclosure section is only for enhancement of understanding of the general background of the disclosure and should not be taken as an acknowledgement or any form of suggestion that this information forms the prior art already known to a person skilled in the art.

SUMMARY

Disclosed herein is a method for handling a data session in a user equipment (UE). The method comprises initiating a data session of at least one application from a plurality of applications with a first communication interface using a first socket of the UE having a first socket file descriptor (SOCKFD) for the data session, detecting a deterioration in a network connection of the first communication interface, identifying a second communication interface, establishing a second socket having a second SOCKFD associated with the second communication interface and migrating the data session from the first communication interface to the second communication interface by mapping the first SOCKFD corresponding to the first socket to the second SOCKFD corresponding to the second socket.

Further, disclosed herein is a network handover system for handling a data session in a user equipment (UE). The network handover system comprises a layer 4 network handover (NH4) module configured to comprise a connection tracker module and a NH4 migrator module. The connection tracker module configured to initiate a data session of at least one application from a plurality of applications with a first communication interface using a first socket of the UE having a first socket file descriptor (SOCKFD) for the data session. The network handover system comprises a switchboard module configured to detect a deterioration in a network connection of the first communication interface and identify a second communication interface. The layer 4 NH4 module configured to establish a second socket having a second SOCKFD associated with the second communication interface, and the NH4 Migrator module configured to migrate the data session from the first communication interface to the second communication interface by mapping the first SOCKFD corresponding to the first socket to the second SOCKFD corresponding to the second socket.

The foregoing summary is illustrative only and is not intended to be in any way limiting. In addition to the illustrative aspects, embodiments, and features described above, further aspects, embodiments, and features will become apparent by reference to the drawings and the following detailed description.

Advantages of the embodiments of the present disclosure are illustrated herein.

In an embodiment, the method of present disclosure effectively handles an on-going data session in a user equipment (UE) by seamlessly switching between available networks.

In an embodiment, the method of present disclosure dynamically detects a deteriorating condition in the network and automatically switches to a second network, thereby eliminating chances of disconnection and/or network drop.

In an embodiment, the method of present disclosure provides an optimized network management technique, which minimizes latency on Wi-Fi networks and reduces unnecessary data consumption on the long term evolution (LTE) network.

Evidently, the present disclosure has a practical application and provides a technically advanced solution to the technical problems associated with existing techniques for cellular network handover. The aforesaid technical advancements and practical applications of the disclosed method may be attributed to the aspect of dynamically detecting the deteriorating network condition and identifying and mapping a second communication interface in place of the deteriorated communication interface for continuing a data session.

In light of the technical advancements provided by the disclosed method and system, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the UEs itself, as the claimed steps provide a technical solution to a technical problem.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
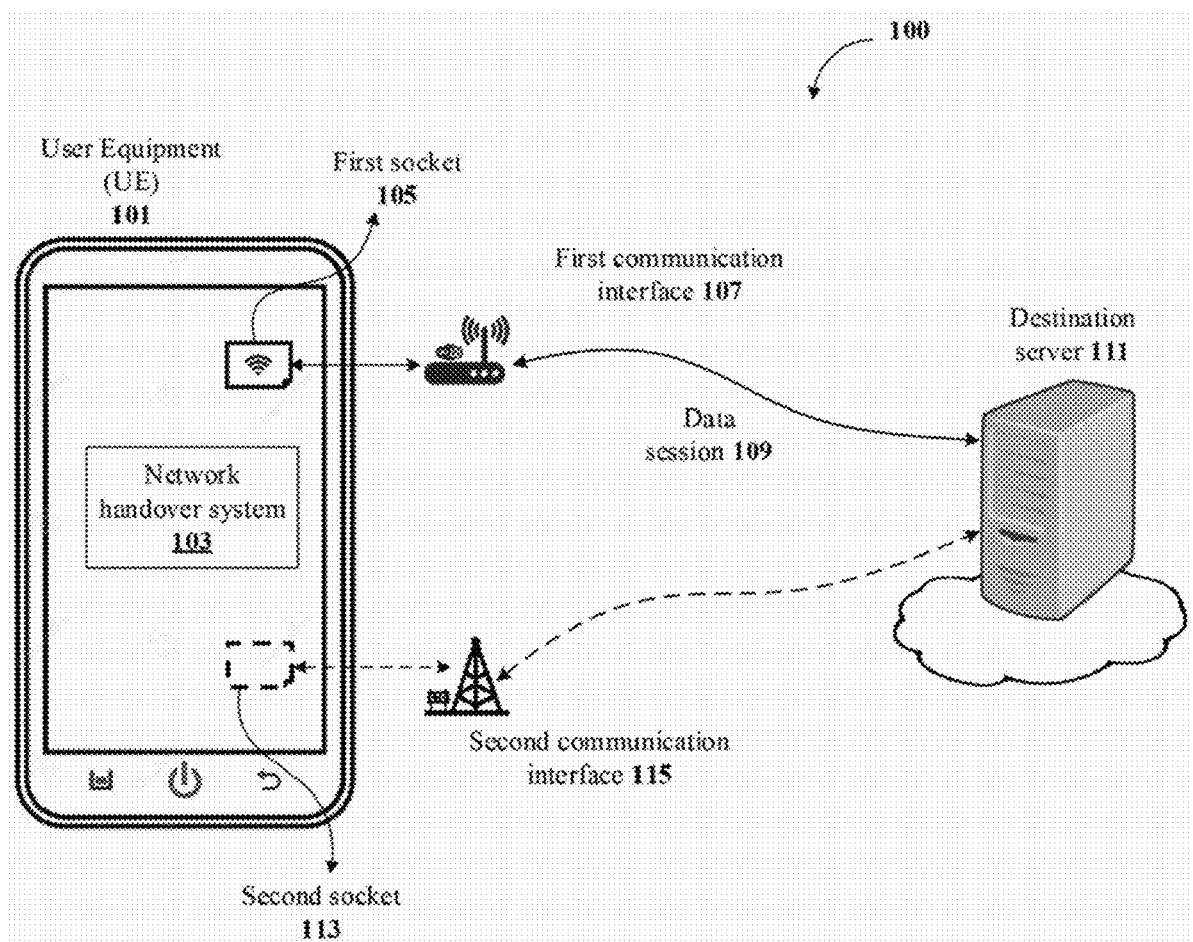
FIGS. 1A and 1B illustrate environment for handling a data session in a user equipment (UE) in accordance with some embodiments of the present disclosure.

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises," "comprising," "includes," or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "an embodiment," "embodiment." "embodiments," "the embodiment," "the embodiments," "one or more embodiments," "some embodiments," and "one embodiment" mean "one or more (but not all) embodiments of the disclosure" unless expressly specified otherwise.

The terms "including," "comprising," "having" and variations thereof mean "including but not limited to," unless expressly specified otherwise. The enumerated listing of items does not imply that any or all the items are mutually exclusive, unless expressly specified otherwise. The terms "a," "an" and "the" mean "one or more," unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it will be clear that more than one device/article (whether the device/article cooperate) may be used in place of a single device/article. Similarly, where more than one device or article is described herein (whether the device and article cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

The present disclosure relates to a method and a network handover system for handling a data session in a user equipment (UE). Initially, the network handover system initiates a data session of at least one application from a plurality of applications with a first communication interface using a first socket of the UE having a first socket file descriptor (SOCKFD) for the data session. Further, the network handover system detects a deterioration in a network connection of the first communication interface. In an embodiment, when the deterioration in the network connection is detected, the network handover system identifies a second communication interface. Subsequently, the network handover system establishes a second socket having a second SOCKFD associated with the second communication interface and migrates the data session from the first communication interface to the second communication interface by mapping the first SOCKFD corresponding to the first socket to the second SOCKFD corresponding to the second socket Thereafter, the data session is continued and/or carried out on the second network communication interface using the second socket, thereby handling the data session on the UE.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1B:
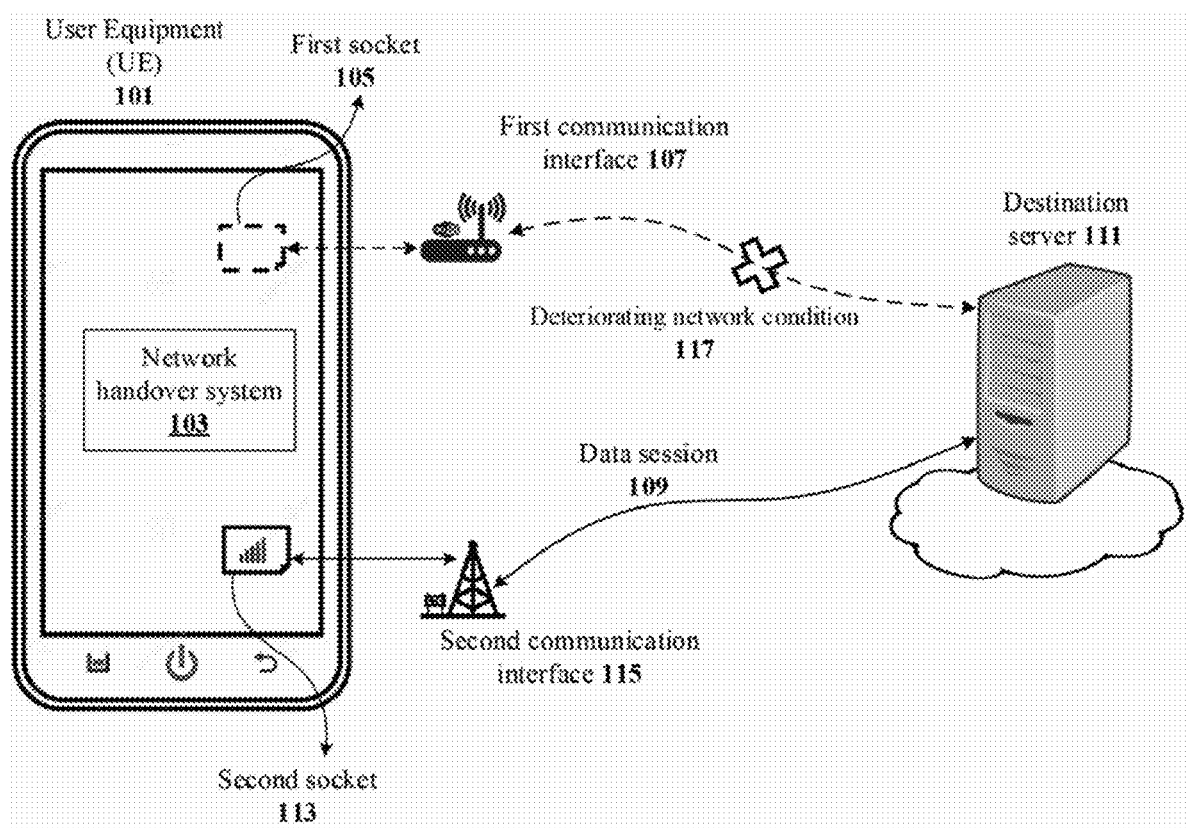

FIGS. 1A and 1B illustrate environment for handling a data session in a user equipment (UE) 101 in accordance with some embodiments of the present disclosure.

As shown in FIG. 1A, the environment 100 may include a User Equipment (UE) 101 and a destination server 111. In an embodiment, the UE 101 may be a computing device such as, without limitation, a smartphone, a laptop, a desktop computer or a similar computing device. In an embodiment, the UE 101 may be configured with the network handover system 103 for ensuring a seamless network connectivity to the UE 101. Further, the UE 101 may comprise a first socket 105 and a second socket 113, which are respectively interface with a first communication interface 107 and a second communication interface. The UE 101 may connect to the destination server 111 using at least one of the first socket 105 and the first communication interface 107 or the second socket 113 and the second communication interface.

In an embodiment, the first socket 105 and the second socket 113 are the network sockets that enable the UE 101 to connect to an external entity, such as the destination server 111, via a selected communication network. As an example, the first communication interface 107 may be Wi-Fi. Similarly, the second communication interface 115 may be long term evolution (LTE) cellular network interface. As another example, the first communication interface 107 may be LTE cellular network interface and the second communication interface 115 may be Wi-Fi. The first communication interface 107 and the second communication interface 115 may be different communication networks. The first communication network 107 and the second communication network 115 may be at least one of 2G, 3G, 4G, 5G, 6G, or a non-3GPP network.

In an embodiment, the network handover system 103 may be configured for effectively handling a data session 109 in the UE 101. As an example, the data session 109 may include, without limiting to, a call service, a chat/messaging service, a live content streaming or an application running in the UE 101. Suppose the data session 109 is being carried out between the UE 101 and the destination server 111. Further, suppose that the default network interface for establishing the data session 109 is the first communication interface 107 accessed via the first socket 105 of the UE 101, as shown in FIG. 1A. Here, when the data session 109 is established through the first communication interface 107, the second socket 113 and the second communication interface 115 may be maintained in an "inactive" state. In other words, the second socket 113 and the second communication interface 115 are operated as a fallback configuration to the first socket and the first communication interface.

As shown in FIG. 1B, in an embodiment, the network handover system 103 may continuously monitor the data session 109 through the first communication interface 107 connecting the UE 101 and the destination server 111 for detect any abnormal and/or deteriorating network condition 117 in the first communication interface 107.

In an embodiment, when a deteriorating network condition 117 is detected in the first communication interface 107, the network handover system 103 may instantly map configuration details of the first communication interface 107 to the second network communication interface 115 to seamlessly switch/handover the data session 109 from the first communication interface 107 to the second communication interface 115. In an embodiment, mapping the configuration details may include mapping a first socket File Descriptor (SOCKFD) corresponding to the first socket 105 to a second SOCKFD corresponding to the second socket 113. Additionally, information stored in a socket buffer associated with the first communication interface 107 may be replicated on the second communication interface 115 to avoid any interruption to the data session 109.

In an embodiment, handover of the data session 109 between the first communication interface 107 and the second communication interface 115 may be performed on an abstract network communication layer of the data session using communication protocols such as, without limiting to, user datagram protocol (UDP), transmission control protocol (TCP) and cross-layer quick UDP internet connections (C-QUIC) protocol. Handing over the data session 109 using the above communication protocols is explained in detail in the following sections of the instant disclosure.

Figure 2A:
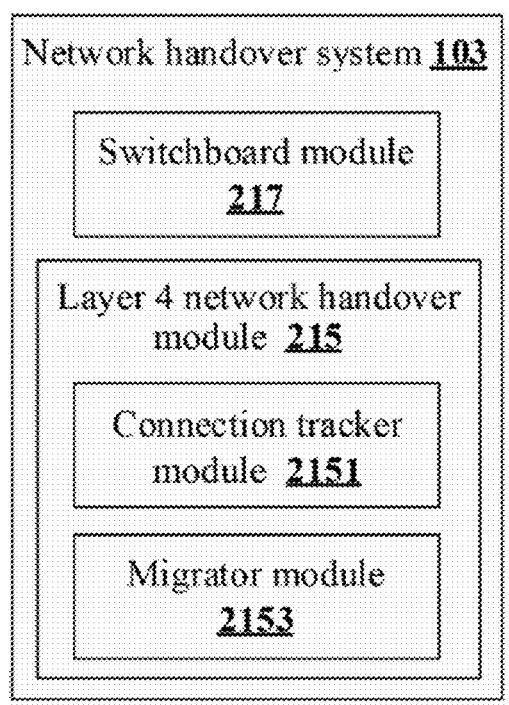
FIGS. 2A and 2B illustrate a block diagram of a network handover system in accordance with some embodiments of the present disclosure.
Figure 2B:
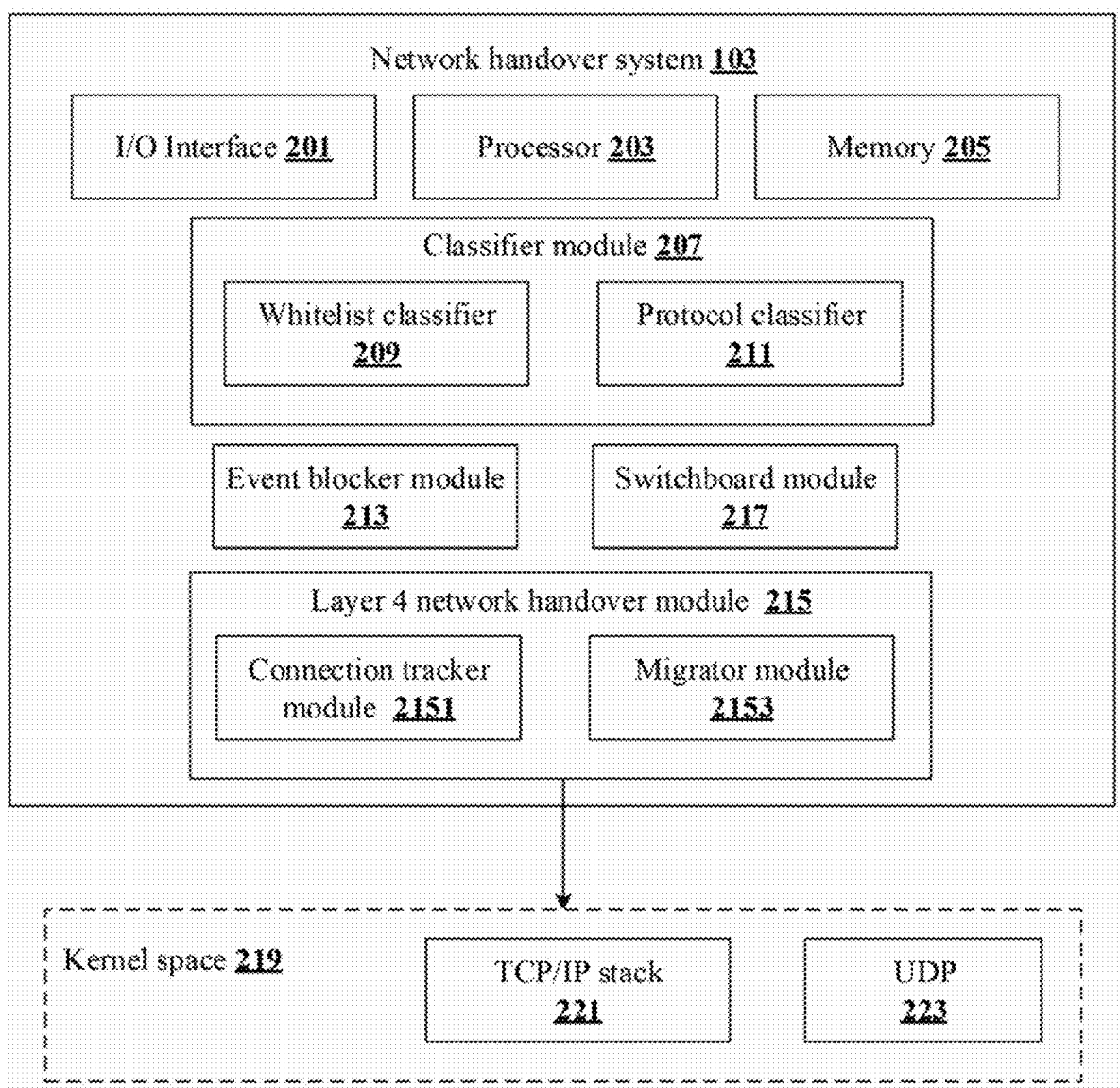

FIGS. 2A and 2B illustrate a block diagram of a network handover system 103 in accordance with some embodiments of the present disclosure. Hereinafter the detailed block diagram of a network handover system 103 according to some embodiments of the present disclosure with reference to FIGS. 2A and 2B.

In an embodiment, the network handover system 103 may include an I/O interface 201, a processor 203, a memory 205, a classifier module 207, an event blocker module 213, a layer 4 network handover (NH4) module 215 and a switchboard module 217.

In an embodiment, the I/O interface 201 may include one or more input/output interfaces of the network handover system 103 that enable the network handover system 103 to interface with the first socket 105 and the second socket 113 and also monitor the data session 109. The processor 203 may be configured to perform each function of the network handover system 103 in accordance with various methods and embodiments of the present disclosure. The memory 205 may be communicatively coupled to the processor 203 and may store data and modules required for performing various operations of the processor 203. In an implementation, the network handover system 103 may have dedicated I/O interface 201, processor 203 and memory 205. In an alternative implementation, the network handover system 103 may use the I/O interface, processor/control unit and memory/storage space of the UE 101 in which the network handover system 103 is configured.

In an embodiment, the classifier module 207 may be configured for classifying various applications running on the UE 101 into different classes/categories based on runtime requirements and/or network connectivity information associated with the applications. In an embodiment, the classifier module 207 may comprise two sub-modules, namely, a whitelist classifier 209 and a protocol classifier 211.

In an embodiment, the whitelist classifier 209 may be configured for classifying applications into a "whitelist" and a "blacklist". In other words, the whitelist classifier 209 helps in deciding whether an application needs to be controlled or not. In an embodiment, when an application is blacklisted, the application may be allowed to use TCP or UDP. That is, the blacklisted applications may not use the multipath TCP (MPTCP) since kernel of the UE 101 does not support MPTCP as a default configuration. In an embodiment, after classifying the applications into "whitelist" and "blacklist", the whitelist classifier 209 may communicate the classified list of applications to the NH4 module (layer 4 NH4 module) 215. The classifier module 207 may classify a plurality of applications running on the UE 101 as at least one of handover-sensitive applications (i.e., whitelist applications) and handover insensitive applications (i.e., blacklist applications). The classification of the plurality applications running on the UE 101 as at least one of handover-sensitive applications and handover insensitive applications may be done based on at least one of nature of application, latency requirement and communication protocol used. The examples for handover sensitive applications may be, but not limited to, gaming applications, latency sensitive applications, UDP-based applications, vehicle-to-everything (V2X) related applications and applications having real-time updates. The examples handover insensitive application may be, but not limited to, messaging application, browsing applications, etc.

In an embodiment, the protocol classifier 211 may be configured for checking or determining the communication protocol requirements associated with each of the whitelisted applications and forward or notify each of the whitelisted applications to the NH4 module 215. As an example, if a whitelisted application is determined to operate over UDP, a data session for the whitelisted application may be established over 0UDP. Similarly, if the whitelisted application is determined to operate over TCP or quick UDP internet connections (QUIC), then the data session for the whitelisted application may be established over seamless TCP (S-TCP) or cross-layer QUIC (CQUIC) respectively. In an embodiment, the protocols 0UDP, S-TCP and CQUIC may be configured on the NH4 module 215 of the network handover system 103. In brief, the protocol classifier 211 of the classifier module 207 may determine a communication protocol corresponding to the handover-sensitive applications and may notify the determined communication protocol to the NH4 module. The communication protocol may be at least one of UDP, TCP and C-QUIC protocol.

In an embodiment, the event blocker module 213 may be configured for controlling notifications from the system framework of the UE 101 to the whitelisted applications. In other words, the event blocker module 213 limits the number of system-generated notifications when the whitelisted application is being actively run on the UE 101. By default, a connectivity manager (CM) in the UE 101 android framework may indicate the change in the connectivity (i.e., activities such as connecting, disconnecting or modification) to the applications via broadcast mechanism. However, if an application is looking for this connectivity broadcast event, the application may decide to provide pop-up or even try to reconnect with the modified interface. Further, if the applications, which are whitelisted, are reacting to this event, then, irrespective of the handover mechanism and the deployed network abstractions, the user might be notified with the network changes, which affects the user experience. Therefore, the event blocker module 213 is configured on top of the CM to restrict the broadcast of events to the whitelisted applications. This, in turn, helps the network handover system 103 to work smoothly and abstract only required events to the user. The event blocker module 213 may perform at least one of block sending of at least one notification from a plurality of notifications to a connection tracker module 2151 regarding the migration of the data session if the data session is for the handover sensitive application, and sending of at least one notification from a plurality of notifications to the connection tracker module 2151 regarding the migration of the data session if the data session is for the handover insensitive application. The at least one notification may indicate at least one of a disconnection with the first communication interface 107, new connection establishment with the second communication interface 115, socket change and signal strength deterioration. The at least of one notification of a plurality of notifications may be sent by one of the network, the first communication interface 107, the second communication interface 115, or lower layers of the UE 101. The lower layers of the UE 101 may comprise service data adaptation protocol (SDAP), packet data convergence protocol (PDCP), radio link control (RLC), medium access control (MAC), and physical layer (PHY).

In an embodiment, the switchboard module 217 may be configured for detecting a deterioration in a network connection of the first communication interface 107 and for identifying a second communication interface 115. The detection of the deterioration in the network connection may be based on at least one of low data throughput, low data rate, lost signal, frame loss, high jitter, and broken connectivity between the UE 101 and the destination server 111. Here, the term "jitter" may refer to variance in the network connection i.e., pit and fall in network connection. For example, average speed may be 100 Mbps but suppose the speed is 1 Mbps for long time in between during the network connection, then it is considered to be high jitter network.

In an embodiment, the NH4 module 215 may be the core module of the network handover system 103. The NH4 module 215 hosts the communication protocols like OUDP, S-TCP and the CQUIC. Further, the NH4 module 215 uses one of the above communication protocols for establishing a data session 109 for the whitelisted application based on the application's preference on the communication protocol. Additionally, the NH4 module 215 may be configured with other network frameworks such as Netfiler® and Iptables® and program libraries such as "C" standard library (LIBC). In an embodiment, the NH4 module 215 may comprise a communication tracker module 2151 and a migrator module 2153.

In an embodiment, OUDP protocol ensures that the stateless properties of the UDP are leveraged while establishing a data session 109 for the whitelisted application. Similarly, S-TCP ensures seamless TCP handover. S-TCP may make use of an abstraction layer over the user application layer during handover of the data session. The abstraction network communication layer may be a software layer that logically resides between application layer and transport layer of the communication interface. The abstraction layer may manage the establishment of connection and data activities (i.e., addition/deletion/modification) of applications (APPs). The abstraction network communication layer may, also, be referred as an abstraction layer. Further, CQUIC makes use of a unique connection ID (CID) to uniquely identify the connection. In the case of CQUIC, any changes in the internet protocol (IP) number does not affect QUIC configuration. That is, CQUIC serves as a cross layer technique to handover the QUIC improving the latency. The connection tracker module 2151 of the NH4 module 215 may initiate a data session of at least one application from a plurality of applications with the first communication interface 107 using the first socket 105 of the UE 101 having a first socket file descriptor (SOCKFD) for the data session. When the switchboard module 217 identifies the second communication interface 115 due to detection of deterioration in a network connection of the first communication interface 107, the NH4 module 215 may establish the second socket 113 having a second SOCKFD associated with the second communication interface 115. In the subsequent step, the migrator module 2153 of the NH4 module 215 may migrate the data session from the first communication interface 107 to the second communication interface 115 by mapping the first SOCKFD corresponding to the first socket 105 to the second SOCKFD corresponding to the second socket 113. The mapping of the first SOCKFD of the first socket 105 to the second SOCKFD of the second socket 113 may be on an abstract network communication layer for the data session. The mapping of the first SOCKFD corresponding to the first socket 105 to the second SOCKFD corresponding to the second socket 113 may be based on the communication protocol determined by the classifier module 207 corresponding to the handover-sensitive applications. One or more applications, running on the UE 101 and using the data session, may not be aware of the migration of the data session. The migrator module 2153 of the NH4 module 215 may migrate the data session back to the first communication interface 107 upon detecting a deterioration in a network connection in the second communication interface 115.

In detail, the initiation of a data session of at least one application from a plurality of applications by the NH4 module 215 may include following steps. The connection tracker module 2151 may receive a socket establishment request from the at least one application from among a plurality of handover-sensitive application on the UE 101. In the next step, the connection tracker module 2151 may request a network by the first communication interface 107 for a plurality of network resources based on the received socket establishment request. In subsequent step, the NH4 module 215 may establish a socket having the first SOCKFD on receiving the requested network resources. The connection tracker module 2151 may initiate the data session on the requested network resources by transmitting a plurality of data packets via the first socket 105 having a first SOCKFD on the first communication interface 107 to the network.

In detail, the migration of the data session from the first communication interface 107 to the second communication interface 115 by mapping the first SOCKFD corresponding to the first socket 105 to the second SOCKFD corresponding to the second socket 113 by the NH4 module 215 may include following steps. The connection tracker module 2151 may detect the first socket 105 being used by a handover-sensitive application and may migrate the first socket 105 from the first communication interface 107 to the second communication interface 115. The NH4 module 215 may detect the data session is for one of the handover-sensitive application and the handover insensitive application.

In an embodiment, when the migration of the data session is using UDP, the NH4 module 215 may receive a notification from the protocol classifier 211 indicating communication protocol to be UDP. In the next step, the NH4 module 215 may determine application data pending for transmission on the first communication interface 107 and may fetch the application data from a socket buffer associated with the first socket 105 of the UE 101 and clone header information of the application data. In subsequent step, the NH4 module 215 may map the cloned header information to the second socket 113 of the UE 101 for continuing the data session through the second communication interface 115.

In an embodiment, when the migration of the data session is using TCP, the NH4 module 215 may receive a notification from the protocol classifier 211 indicating communication protocol to be TCP. In the next step, the NH4 module 215 may create an abstract network communication layer corresponding to the first socket 105 of the UE 101. In subsequent step, the NH4 module 215 may map SOCKFD associated with the first socket 105 to a pseudo socket corresponding to the abstract network communication layer and may continue the data session through the pseudo socket file descriptor.

In an embodiment, the NH4 module 215 may be configured for managing network services with the network sockets and the communication interfaces of the UE 101. In an embodiment, the NH4 module 215 may include network manager frameworks such as a network connectivity manager, a telephony service, a Wi-Fi manager and a radio interface layer.

In an embodiment, the network handover system 103 may be set-up in communication with the kernel of the UE 101 while managing the data session on the UE 101. In an embodiment, in addition to having control over all the hardware and software components of the UE 101, the kernel space 219 of the UE 101 may allow the network handover system 103 to access the communication protocols like TCP, TCP/IP stack 221 and the UDP 223 while handing over data sessions for the whitelisted applications.

In an embodiment, the handover operation performed using the network handover system 103 may be different from the handover on MPTCP in the following ways. In an embodiment, network handover system 103 is a client-only solution. That is, the network handover system does not require any server-side modifications to initiate the handover. As a result, the network handover system 103 only requires simpler changes in the user-space only. Whereas handover over MPTCP requires kernel-level changes and hence, takes a lot of time. In other words, the provided network handover is a light-weight approach when compared to that of the MPTCP. Moreover, the network handover system 103 not only enhances TCP, but also enhances UDP and other protocols like QUIC. Also, the provided handover introduces a transient layer, where LTE is brought up and/or engaged only when the Wi-Fi is predicted to be weak. This saves power consumption on the UE 101. On the other hand, in the existing implementation of the MPTCP, both LTE and Wi-Fi are engaged and running always.

In an embodiment, the network handover system 103 also uses the event blocker module 213 to effectively block the events from connectivity manager to the application. On the other hand, MPTCP lacks this framework component, and may react to connectivity events while the application layer is still looking for a handover. Thus, the provided network handover system 103 is more effective and optimized than the handover using MPTCP.

Figure 3:
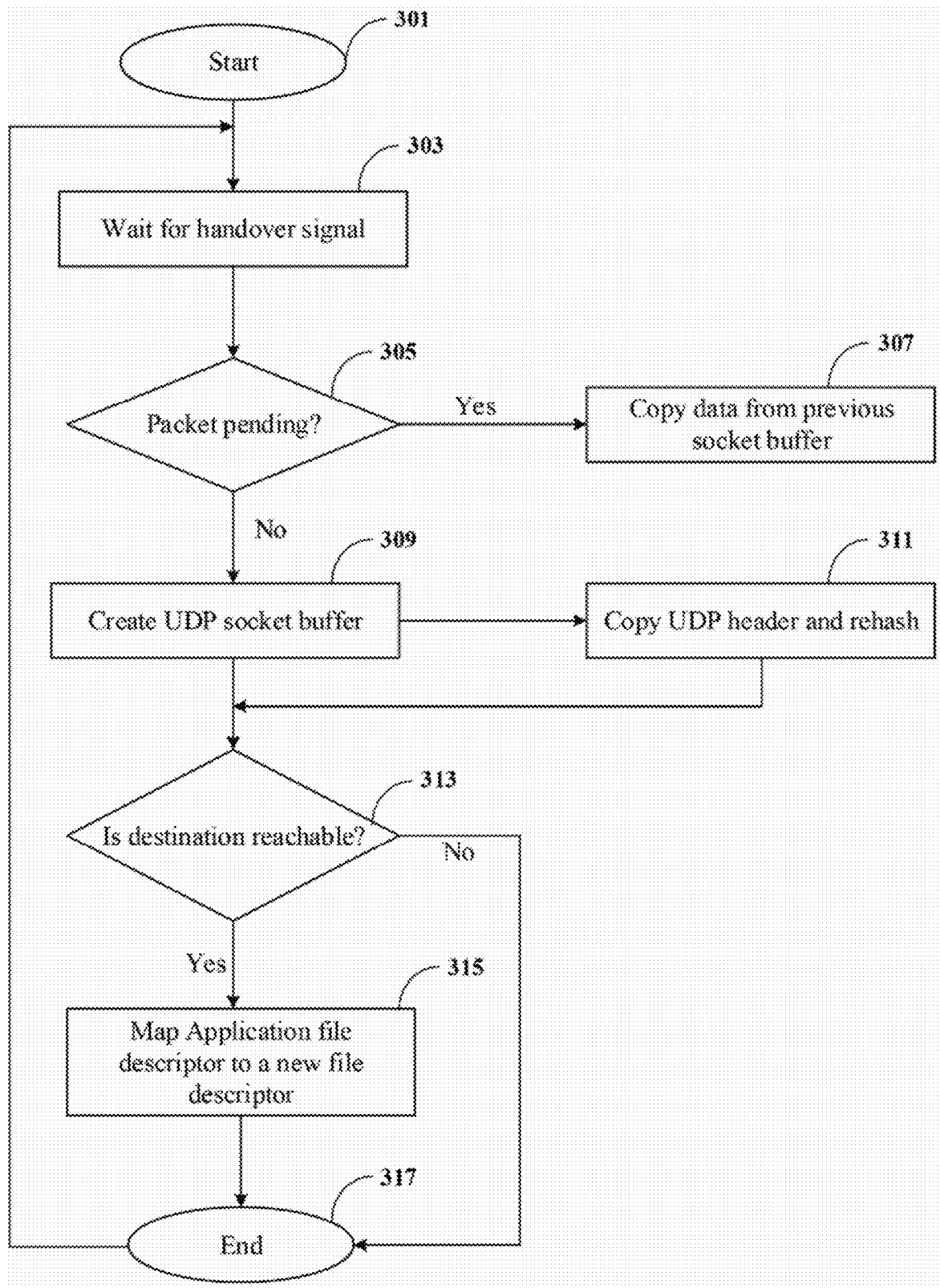
FIG. 3 illustrates a flowchart of a method for a network handover using user datagram protocol (UDP) in accordance with some embodiments of the present disclosure.

FIG. 3 illustrates a flowchart of a method for a network handover using user datagram protocol (UDP) in accordance with some embodiments of the present disclosure.

In an embodiment, step 301 indicates start of a data session 109 between the UE 101 and the destination server 111 through a first channel consisting the first socket 105 and the first communication interface 107. During the data session 109, the network handover system 103 continuously monitors the data session 109 and wait for a "handover signal", as shown in step 303. The "handover signal" may be generated when the UE 101 experiences a deteriorating network condition 117 during the data session 109. When a "handover signal" is received, the network handover system 103, at step 305, checks whether there are any data packets pending for transmission in the data session 109. For example, if handover signal received, the 0UDP checks for previous data queued. Generally, the handover may happen when: a) the application has sent the packet out and b) application has sent the packets to the kernel, but the kernel has not placed those packets to the external network. So, at step 305, the network handover system 103 checks whether the kernel still holds some packets to be sent to the external server.

In an embodiment, if there are pending data packets, then, at step 307, the network handover system 103 fetches the pending data packets from a socket buffer associated with the first socket 105 and copies them on to the socket buffer or a memory space associated with a second socket 113. However, if there are no pending packets, then the network handover system 103 may simply create a UDP socket buffer with "0" Bytes to be used for the rest of the data session, as indicated in step 309. Thereafter, at step 311, the UDP header may be copied and rehashed for using in the re-established data session. Once the UDP header and the socket buffer are ready, the network handover system 103, at step 313, checks whether the destination (i.e., the destination server 111) is still reachable for completing the data session.

Sometimes, due to firewall, the destination may not be reachable. So, the network handover system 103 checks whether the destination is still reachable for completing the data session. For example, LTE packet may reach a server A. The UDP header changes and checks if a packet may reach the server A when the network handover system 103 move from LTE to Wi-Fi.

If the destination is reachable, the network handover system 103 may map the file descriptor of the application to a new file descriptor corresponding to the UDP socket and continue the data session, as indicated in step 315. However, if the destination is not reachable, then the handover process may be terminated, as indicated in step 317. The aforesaid process is repeated each time the UE 101 experiences a deteriorating network condition 117 during a data session 109.

Figure 4A:
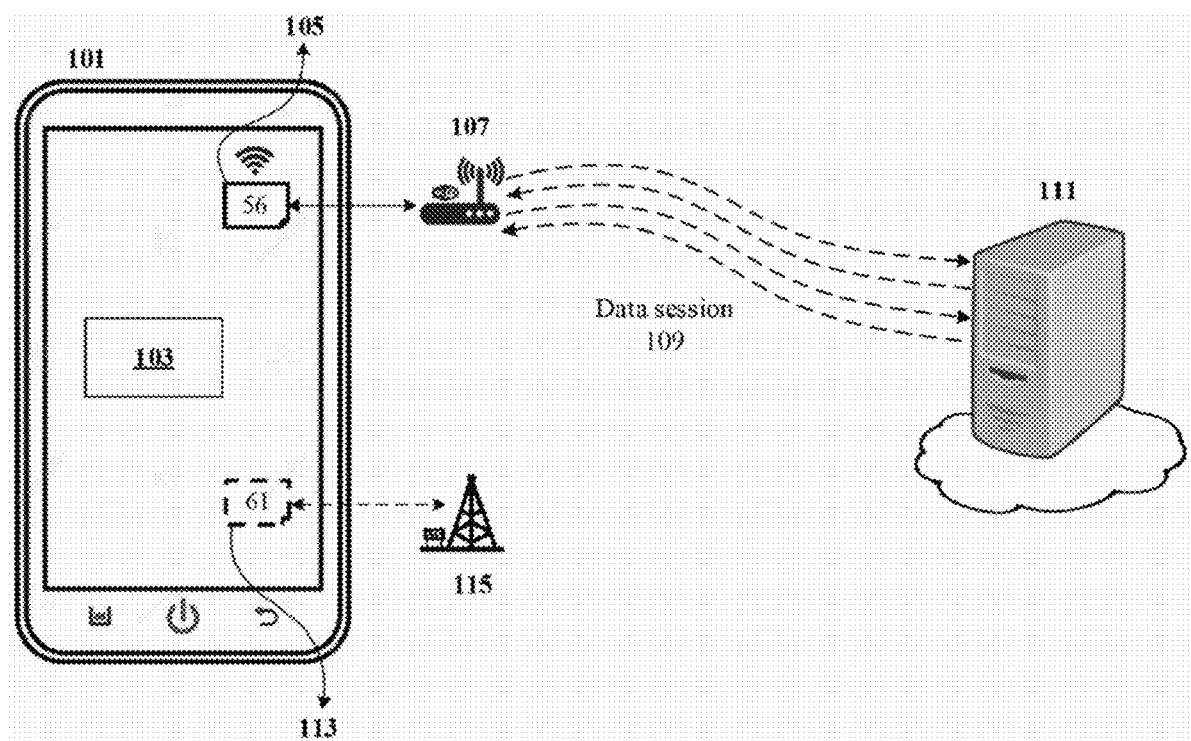
FIGS. 4A and 4B illustrate a network handover using user datagram protocol (UDP) in accordance with some embodiments of the present disclosure.
Figure 4B:
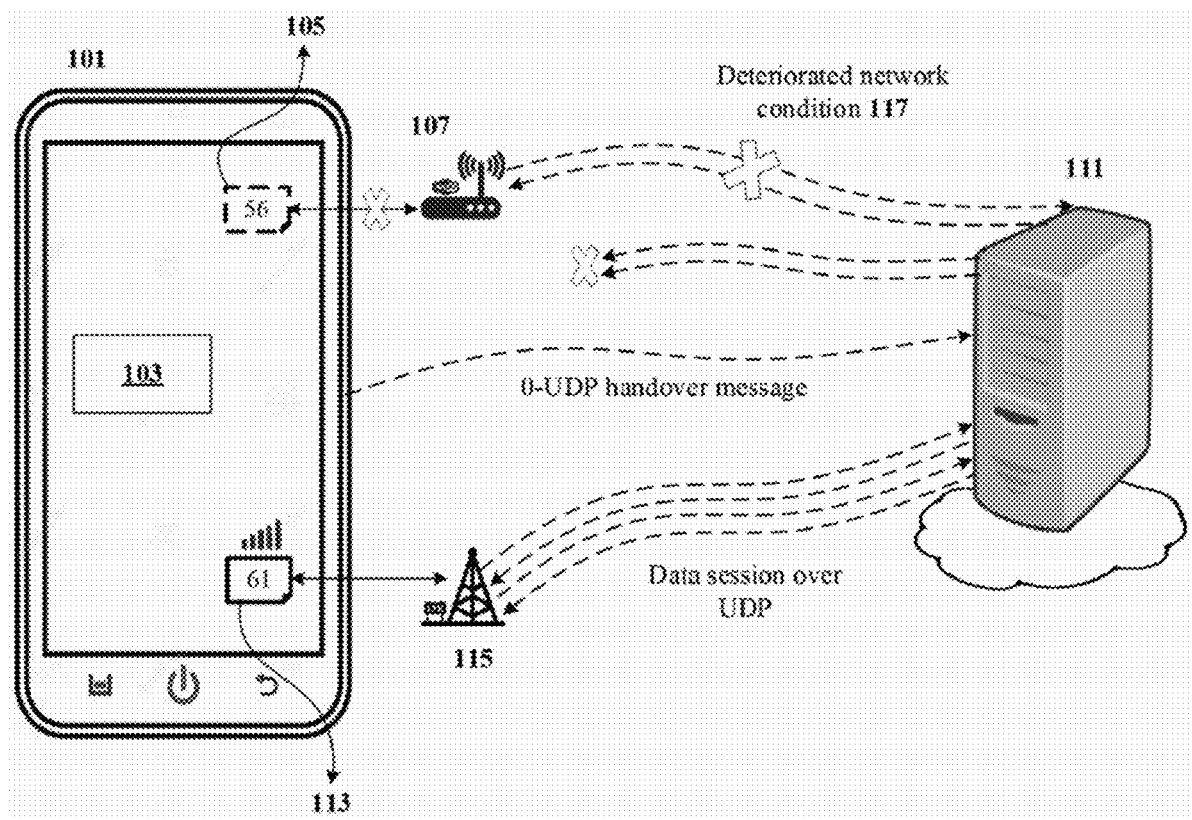

FIGS. 4A and 4B illustrate a network handover using user datagram protocol (UDP) in accordance with some embodiments of the present disclosure.

FIG. 4A illustrates a data session 109 between the UE 101 and the destination server 111 using the first socket "56" and the first communication interface 107. Here, the first communication interface 107 may be Wi-Fi, such that the UE 101 connects to the destination server 111 over Wi-Fi. At this instance, the second socket "61" and the second network communication interface 115 may be configured and available but placed in a "wait" state. That is, the second socket "61" and the second network communication interface 115 takeover the data session only when there is a deteriorating network condition 117 on the first communication interface 107.

FIG. 4B illustrates the scenario in which there is a deteriorating network condition 117 on first communication interface 107 and the data session between the UE 101 and the destination server 111 has been interrupted. As an example, the deteriorating network condition 117 may include without limiting to, low data throughput, low data rate, lost signal or broken connectivity between the UE 101 and the destination server 111. Further, as indicated in FIG. 4B, the deteriorating network condition 117 may arise at the first socket "56," an interface between the first socket "56" and the first communication interface 107 or on the communication channel connecting to the destination server 111.

In an embodiment, the destination server 111 may attempt to push one or more data packets to the UE 101 even in the deteriorated network condition, until the destination server 111 becomes aware of the deteriorating network condition 117 on the first communication interface 107. At this point, the network handover system 103 detects the deteriorating network condition 117 and transmits a 0-UDP handover message to the destination server 111, indicating the destination server 111 that a deteriorating network condition 117 has occurred on the first communication interface 107. Simultaneously, the network handover system 103 may map and/or replicate the pending packets and socket buffer information related to the first communication interface 107 on the second socket "61" and the second communication interface 115 and handovers the data session to the second communication interface 115. By doing so, the application running on the UE 101 is unaware of the socket migrations. Thereafter, the data session 109 is re-established over the UDP-driven second communication interface 115 and the second socket "61." Here, the destination server 111 continues to participate in the data session 109 as if the destination server is communicating with the UE 101 over the first communication interface 107.

That is, the network handover system 103 seamlessly hands over the data session from the first communication interface 107 to the second communication interface 115. Here, it may be noted that 0-UDP is a client-only solution that detects the need for handover and intelligently handovers the server connection without any changes in the server. Suppose the application running on the UE 101 opens a file descriptor "X." During handover, "X" may be first mapped to a default file descriptor, say "Y" Subsequently, when a new connection is opened using the second communication interface 115, if all the requisite conditions are met, a new file descriptor "Z" may be created and mapped to the original application descriptor "X." That is, X→Z. Here, the original file descriptor "X" is not aware of "Y" and "Z." Hence, the handover may be seamless.

In an embodiment, the data session may be handed over back to the first communication interface 107 upon determining a deteriorating network condition 117 on the second communication interface 115. That is, the network handover system 103 may dynamically decide which of the available communication interfaces (i.e., either first or second) is best suited for carrying out the data session.

Figure 5A:
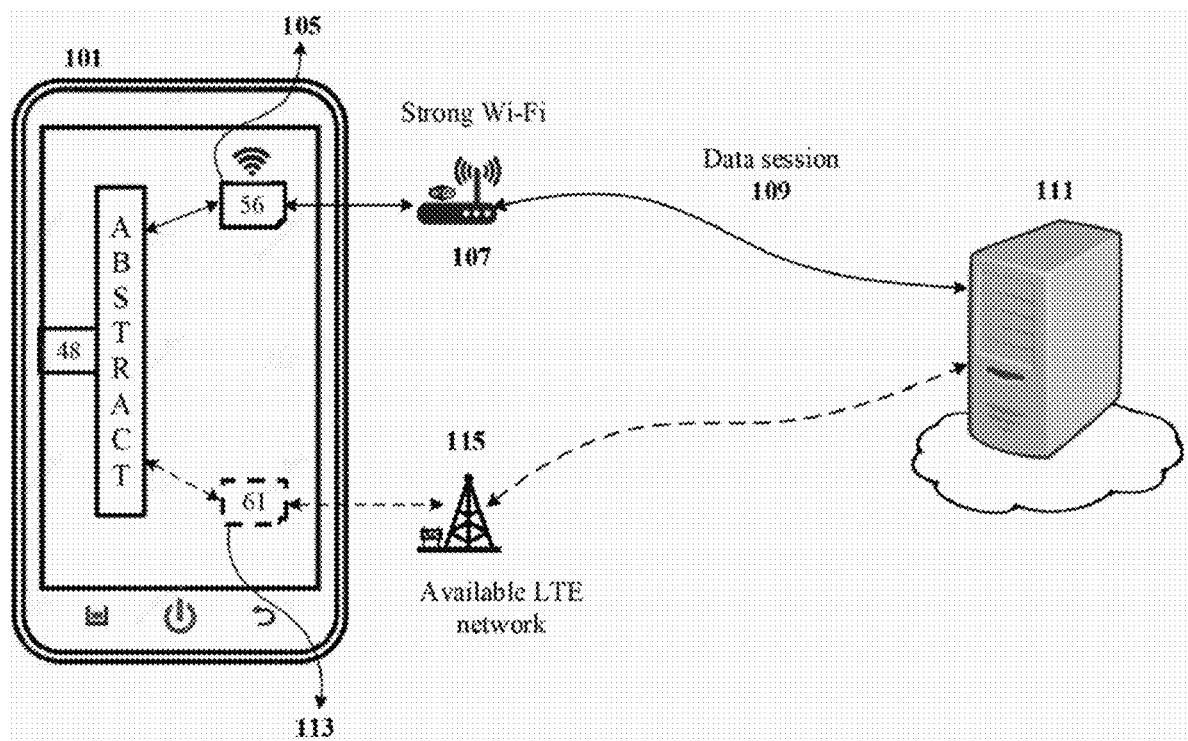
FIGS. 5A and 5B illustrate a network handover using transmission control protocol (TCP) in accordance with some embodiments of the present disclosure.
Figure 5B:
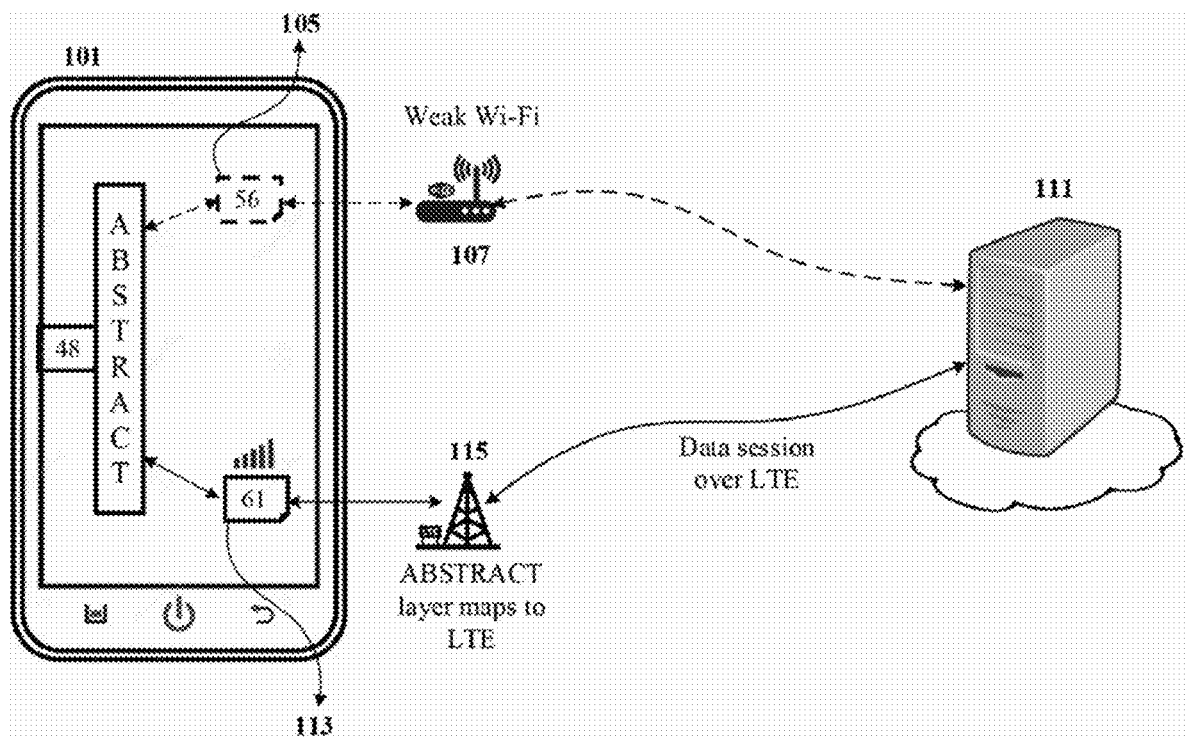

FIGS. 5A and 5B illustrate a network handover using transmission control protocol (TCP) in accordance with some embodiments of the present disclosure.

In an embodiment, the S-TCP protocol may create an abstraction layer for carrying out the handover. Further, during the handover, the file descriptor of the application may be mapped to the abstraction layer. The abstraction layer may be always up and running, and the application would be unaware of the connectivity changes (i.e., the handover) and failures in the communication channel. In an embodiment, the S-TCP may open multiple sockets and map file descriptors of one of the sockets to the file descriptor of the application. The socket mapping may be dynamic and changed anytime during the data session as well. Essentially, the S-TCP may identify the best interface based on the network parameters and use the best interface for the handover at any point of time. This ensures that the application is enriched with seamless connectivity experience even during weak network conditions. The network parameters may include, but not limited to, received signal strength indicator (RSSI), reference signal received power/quality (RSRP/RSPQ), signal to interference noise ratio (SINR), current data rate, peak data rate, current latency, probability of packet loss and round-trip-time (RTT).

As indicated in FIG. 5A, suppose, the first communication interface 107 be the default communication interface for the UE 101 and the data session between the UE 101 and the destination server 111 may be established on the first communication interface 107. At this point, the application socket "48" of the application running on the UE 101 may be mapped to the first socket "56" associated with the first communication interface 107. At the same time, the second socket "61" and the second communication interface may be set-up and put in the "wait" state.

Further, as indicated in the FIG. 5B, suppose the strength of the Wi-Fi signal on the first communication interface 107 gets weaker during the data session 109, resulting in an increase in the latency. At this point, the network handover system 103 detects a deteriorating network condition 117 on the first communication interface 107 and may dynamically decide to handover the data session to the second communication interface 115. Consequently, the network handover system 103 in the UE 101 may map the application socket "48" to the second socket "61" through the abstraction layer. In other words, the abstraction layer maps to the LTE socket on the UE 101. Once the second communication interface is up and running, the data session 109 continues on the second communication interface. In addition, the data session may be returned to the first communication interface 107 when there is a deteriorating network condition 117 on the second communication interface 115. The application running on the UE 101 and the destination server 111 are unaware of the handover and continue to participate in the data session seamlessly.

Figure 6:
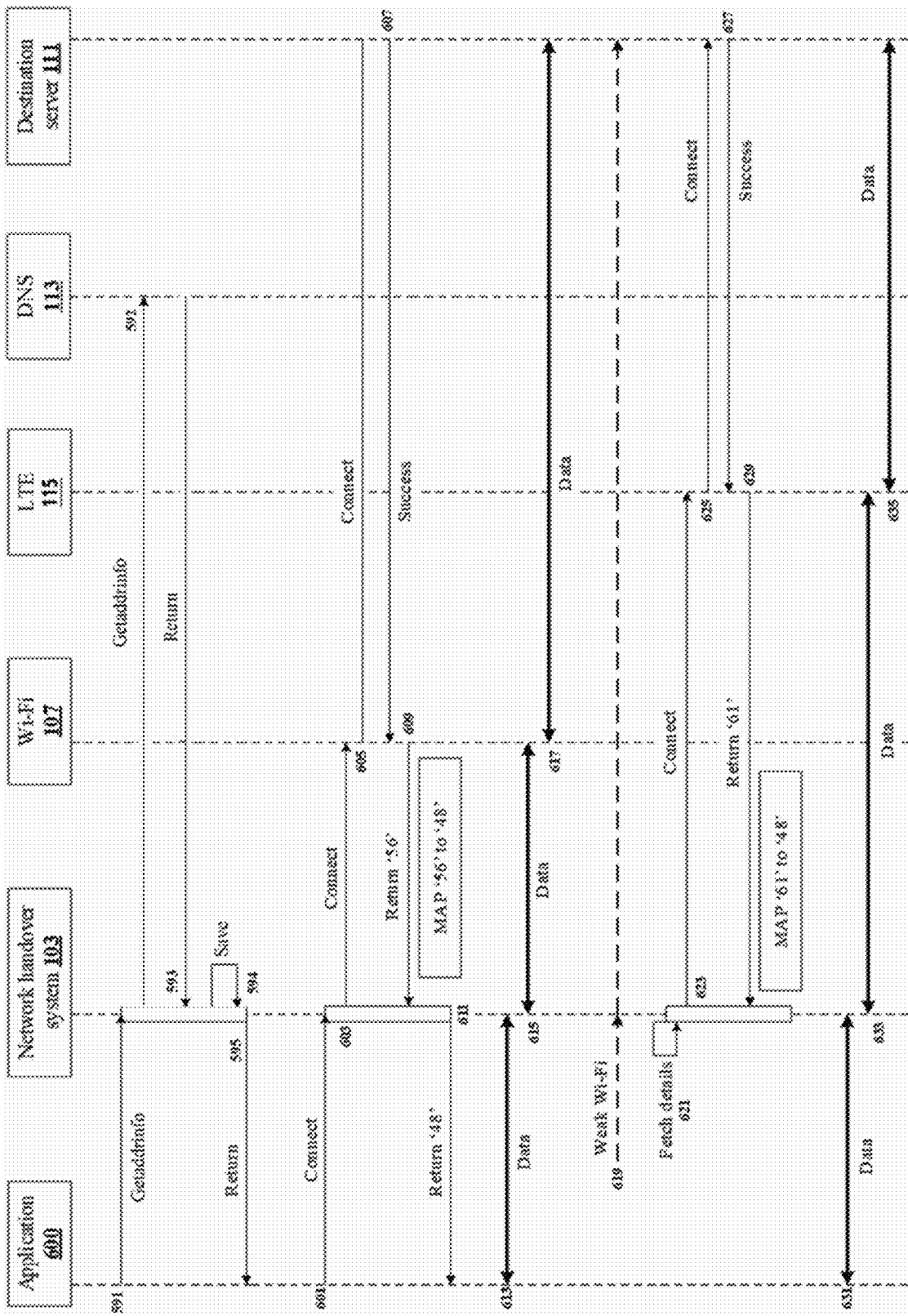
FIG. 6 illustrates a sequence diagram of events performed in network handover using transmission control protocol (TCP) in accordance with some embodiments of the present disclosure.

The series of actions that take place during the handover are illustrated in detail in the sequence diagram of FIG. 6. In an embodiment, the network handover system 103 is an intermediary between the application 600 running on the UE 101 and the network interfaces (i.e., the first communication interface 107 and the second communication interface 115). First, the application 600 queries the DNS to the DNS server 113. In steps 591 and 592, the application 600 inquires of the DNS server 113 address information (i.e., IP address) via the network handover system 103 (i.e., the NH4 module). In step 593, the DNS server 113 returns list of IP addresses. In steps 594 & 595, the network handover system 103 stores the server details and returns the list to the application 600. The application 600 tries to establish the connection with the end server using CONNECT system call (FD 48). The network handover system 103 taps the CONNECT system call and check if the IP address (DESTINATION) is from the list of previously saved address.

Step 601 indicated start and/or running instance of the application 600, where the application 600 has to connect with the destination server 111. Accordingly, at step 601, the application 600 transmits a "connect" request to the network handover system 103. At step 603, the network handover system 103 fetches details of the connection requested by the application 600 and transmits the connection requested by the application to the default first communication interface 107, which is Wi-Fi. At step 605, the first communication interface 107 connects to the destination server 111. The destination server 111, upon receiving the "connect" request, validates the request and returns a "success" message to the first communication interface 107 after a successful validation of the "connect" request at step 607. Further, at step 609, the first communication interface 107 forwards the "success" signal to the network handover system 103. At this point, the first communication interface 107 also notifies a socket identifier of the first socket (i.e., 56) to the network handover system 103, which in turn, maps the first socket "56" to the application socket "48" of the application 600. Further, at step 611, the network handover system 103 returns details of the mapped application socket "48" to the application 600, indicating successful connection with the destination server 111. Consequently, the application 600 initiates a data session 109 with the destination server 111 at steps 613, 615, and 617.

Suppose, at step 619, the signal on the first communication interface 107 gets weaker during the data session. This condition may be treated as a deteriorating network condition 117 and the same may be notified to the network handover system 103 and the network interfaces 107 and 109. Consequently, at step 621, the network handover system 103 fetches details such as socket identifier and pending data packets in the socket buffer from the first communication interface 107. Further, at step 625, the network handover system 103 initiates the handover by trying to establish the connection over the second communication interface 115. At steps 625 and 627, the second communication interface 115 complete validation with the destination server 111 by exchanging the "connect" and success" signals. Once the validation is complete, at step 629, the second communication interface 115 returns the ID of the second socket "61" to the network handover system 103. Then the network handover system 103 maps the second socket "61" to the application socket "48" and establishes a connection with the destination server 111 using the second communication interface 115. Thereafter, the application 600 seamlessly completes the data session with the destination server 111 using the second communication interface 115 as indicated in steps 631, 633 and 635. Here, the application 600 is unaware of the migration of the data session from Wi-Fi to LTE, since for the application 600, the socket 48 still remains undisturbed and does not feel disconnected.

Figure 7:
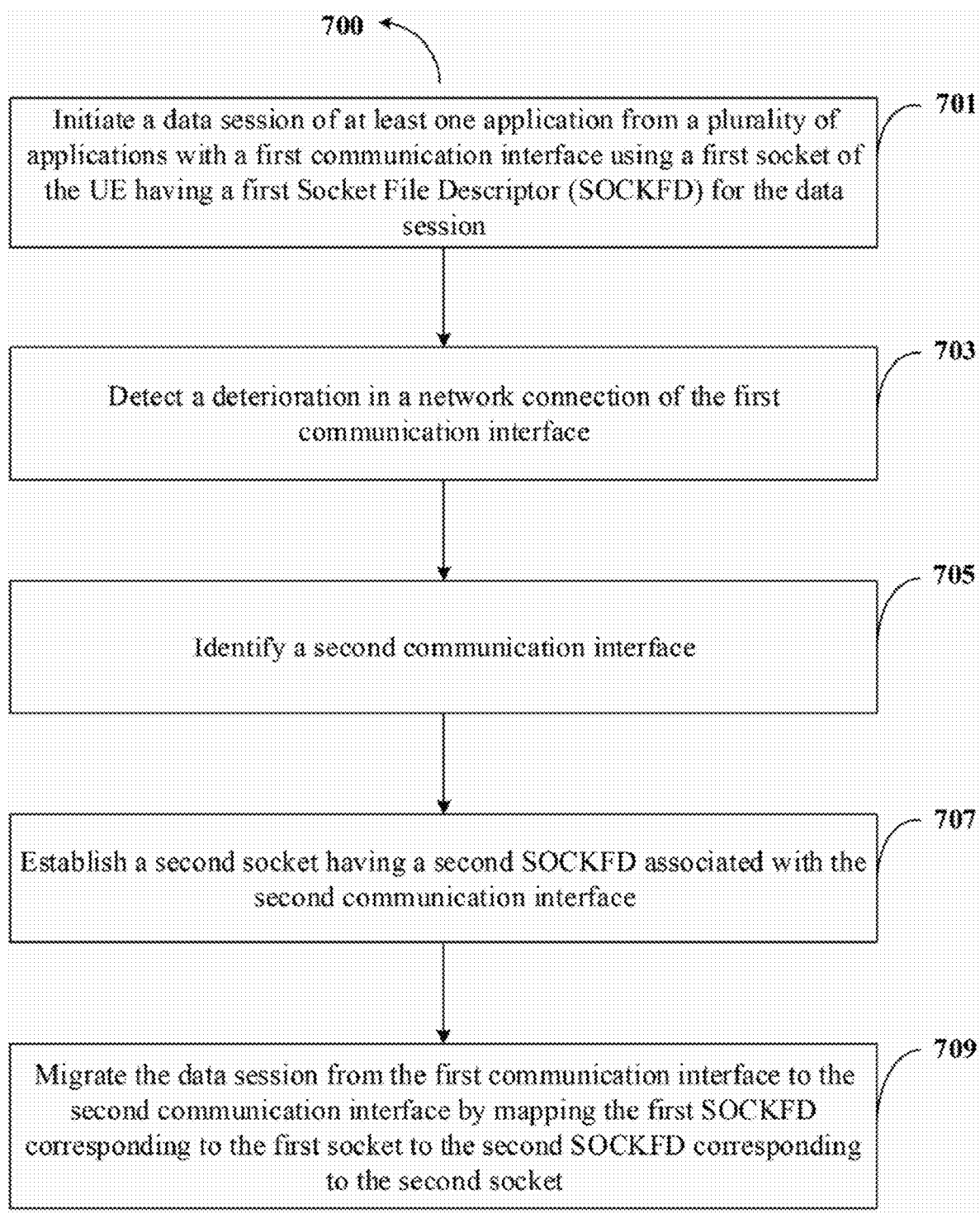
FIG. 7 illustrates a flowchart of a method for handling a data session in a UE in accordance with some embodiments of the present disclosure.

FIG. 7 illustrates a flowchart of a method for handling a data session in a user equipment (UE) 101 in accordance with some embodiments of the present disclosure.

As illustrated in FIG. 7, the method 700 may include one or more steps illustrating a method for handling data session in the UE 101. The order in which the method 700 is described is not intended to be construed as a limitation, and any number of the described method steps can be combined in any order to implement the method. Additionally, individual steps may be deleted from the methods without departing from the scope of the subject matter described herein. Furthermore, the method can be implemented in any suitable hardware, software, firmware, or combination thereof.

At step 701, the method 700 includes initiating, by the connection tracker module of the 2151 network handover system 103, a data session 109 of at least one application from a plurality of applications with the first communication interface 107 using the first socket 105 of the UE 101 having a first socket file descriptor (SOCKFD) for the data session. In an embodiment, the data session 109 may be a communication session that connects the UE 101 with a first communication interface 107, and in turn with a destination server 111, using a first socket 105 of the UE 101. As an example, the first communication interface 107 may be Wi-Fi.

At step 703, the method 700 includes detecting, by the switchboard module 217 of the network handover system 103, a deterioration in a network connection (or network condition) 117 of the first communication interface 107 during the data session 109. In an embodiment, the deteriorating network connection 117 may interrupt or disrupt the data session 109. The detection of the deterioration in the network connection may be based on at least one of low data throughput, low data rate, lost signal, frame loss, high jitter, and broken connectivity between the UE 101 and the destination server 111. In an implementation, the deteriorating network condition 117 may be detected by at least one of the UE 101 and the abstract network communication layer. Here, the abstract network communication layer may be transport layer in between application layer and transport layer of the communication interface. A connection notification or broadcast events indicating the deterioration in the network connection may be sent to the abstract network communication layer by the switchboard module 217.

At step 705, the method 700 includes identifying, by the switchboard module 217 of the network handover system 103, a second communication interface 115.

At step 707, the method 700 includes establishing, by the layer 4 Network Handover (NH4) module 215 of the network handover system 103, a second socket 113 having a second SOCKFD associated with the second communication interface 115. Here, the second socket 113 may be network socket corresponding to the second communication interface 115. In an embodiment, the second communication interface 115 may be different from the first communication interface 107. As, an example, the second communication interface 115 may be long term evolution (LTE) cellular network interface.

At step 709, the method 700 includes migrating, by the NH4 migrator module 2153 network handover system 103, the data session from the first communication interface 107 to the second communication interface 115 by mapping the first SOCKFD corresponding to the first socket 105 to the second SOCKFD corresponding to the second socket 113 for seamlessly handing over or migration of the data session 109 to the second communication interface 115. In an embodiment, the mapping of the first SOCKFD of the first socket 105 to the second SOCKFD of the second socket 113 may be performed on an abstract network communication layer for the data session. Also, in an implementation, an application, running on the UE 101 and using the data session, may not be aware of the migration of the data session 109.

The network handover system 103 may continue the data session 109 on the second communication interface 115 using the second socket 113, thereby handling the data session on the UE 101. Thereafter, the data session may be concluded as if the data session was originally carried out on the first communication interface 107.

In an embodiment, prior to migration of the data session, the network handover system 103 may perform one or more actions in the UE 101. Initially, the classifier module 207 of the network handover system 103 may classify, a plurality of applications running on the UE 101 as at least one of handover-sensitive applications (i.e., whitelist applications) and handover insensitive applications (i.e., blacklist applications). The classification of the plurality applications running on the UE 101 as at least one of handover-sensitive applications and handover insensitive applications may be done based on at least one of nature of application and latency requirement of the application. Further, a communication protocol corresponding to the handover-sensitive applications may be determined by the classifier module 207 and the determined communication protocol may be notified to the NH4 module 215 by the classifier module 207.

Subsequently, the first SOCKFD corresponding to the first socket 105 of the UE 101 may be mapped to the second SOCKFD corresponding to the second socket 113 of the UE 101 based on the determined communication protocol by the NH4 migrator module 2153. After mapping, a plurality of notifications related to the handover-sensitive applications may be controlled during migration of the data session by the event blocker module 213.

In an embodiment, the communication protocol may be at least one of user datagram protocol (UDP), transmission control protocol (TCP) and cross-layer quick UDP internet Connections (C-QUIC) protocol. In an implementation, handing over the data session using the UDP may include determining application data pending for transmission on the first communication interface 107. Once the pending data has been determined, the application data may be fetched from a socket buffer associated with the first socket 105 of the UE 101 and header information of the application data may be cloned. Thereafter, the cloned header information may be mapped to the second socket 113 of the UE 101 for continuing the data session through the second communication interface 115.

On the other hand, handing over the data session using the TCP may follow a slightly different procedure and may comprise creating an abstraction layer corresponding to the first socket 105 of the UE 101 and mapping SOCKFD associated with the first socket 105 to a pseudo socket corresponding to the abstraction layer. Thereafter, the data session may be continued and/or re-established through the pseudo socket file descriptor.

In an embodiment, during handover using the QUIC, the CQUIC model dynamically predicts the signal-to-interference-noise-ratio (SINR) and models the handover decision pro-actively. This helps in improving the latency by initiating handover well-ahead of the possible connection termination or deteriorating condition in the interface.

In an embodiment, with the configuration of the network handover system 103 in the UE 101, a transient layer may be introduced in the network configurations of the UE 101. In the transient layer, the Wi-Fi and the mobile data/LTE may be enabled only when—a) it is predicted that Wi-Fi has a weak signal and/or b) when there is a probability that the Wi-Fi may be disconnected. The above operation of the transient layer in the network handover system 103 is different from the way it is operated in the existing default network management strategy or the MPTCP. A comparison in the behavior of the handover in each of these techniques is illustrated in Table A below.

TABLE A

| Network condition | Default mechanism | MPTCP | Provided network handover |
|---|---|---|---|
| Weak Wi-Fi | No action; Only Wi-Fi is up | Both Wi-Fi and LTE are up | Enable transient layer for LTE and Wi-Fi; LTE is made default for whitelisted applications |
| Strong Wi-Fi | No action; Only Wi-Fi is up | Both Wi-Fi and LTE are up; Causes battery drain since LTE is up | Both "Whitelist" and "Blacklist" applications use Wi-Fi; LTE is not enabled. Hence, power consumption is optimized |
| Wi-Fi disconnected | "Wi-Fi disconnect" event is triggered; LTE is connected | "Wi-Fi disconnect" event is triggered; LTE is connected | "Whitelist" applications already use LTE; Now all the applications start using LTE as a default. |

Figure 8:
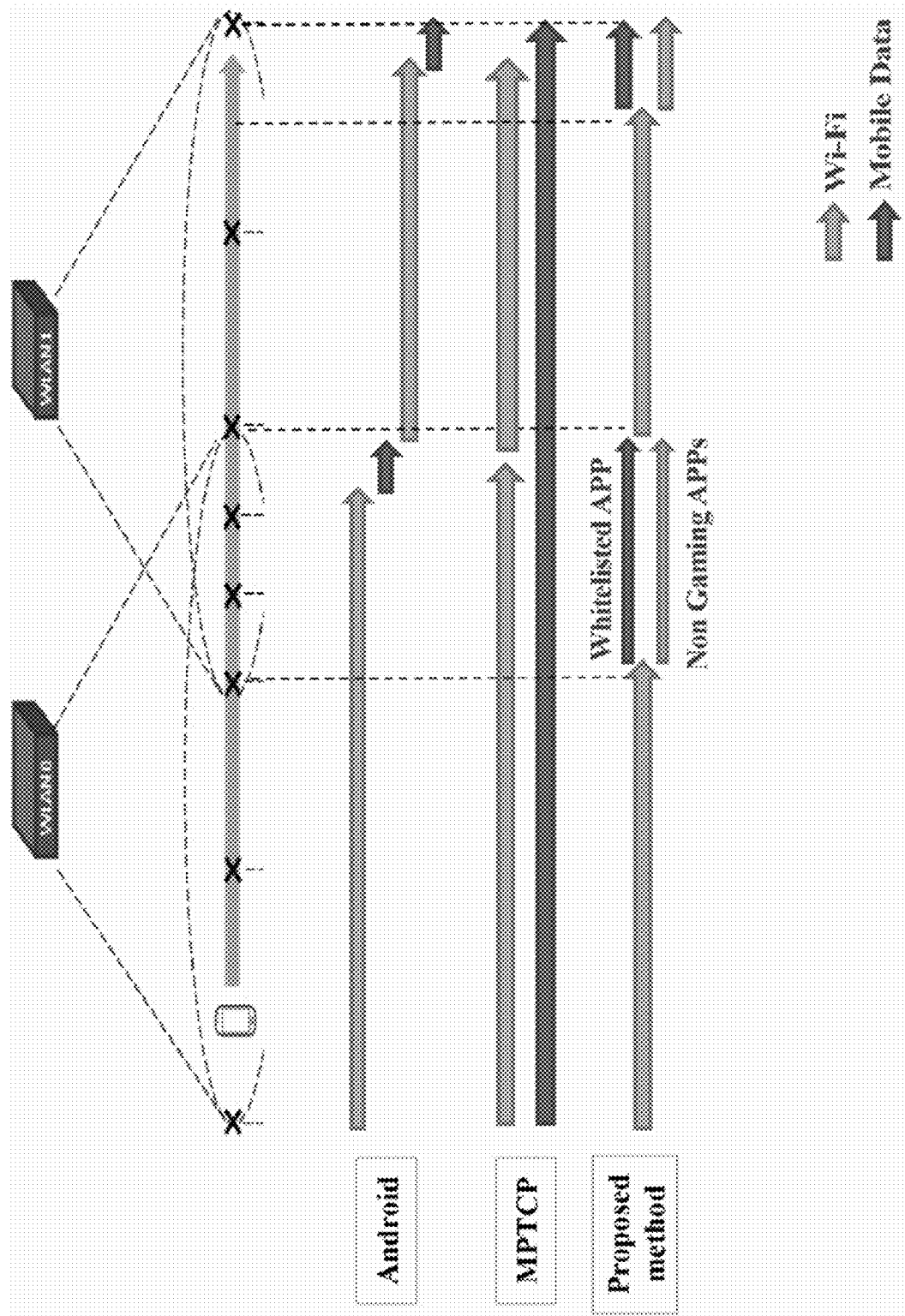
FIG. 8 illustrates a comparison between existing handover techniques and a provided handover method in accordance with some embodiments of the present disclosure.

FIG. 8 illustrates a comparison between existing handover techniques and the provided handover method in accordance with some embodiments of the present disclosure.

FIG. 8 provides an exemplary overview of the network handover in the Android® framework, MPTCP and using the provided network handover system 103. In the case of Android®, the handover may not be seamless. Thus, the application and/or the users go through a poor quality of experience during the handover, specifically, when there is a handover from weak and/or disconnected Wi-Fi to the LTE and vice-versa. In the case of MPTCP, both the LTE and the Wi-Fi are always up and running. Though the handover is seamless in MPTCP, it is a resultant of higher power consumption and higher data consumption. On the other hand, the handover on the provided network handover system 103 is both seamless and optimized. This is because, the network handover system 103 pro-actively classifies the applications into "whitelist" and "blacklist" applications and ensures that only the "whitelist" applications switch to the LTE in case of an interruption on the Wi-Fi network. Also, as explained in the earlier sections, the handover using the network handover system 103 is seamless and optimized since only the whitelisted applications use the LTE.

In an embodiment, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include random access memory (RAM), read-only memory (ROM), volatile memory, nonvolatile memory, hard drives, compact disc (CD) ROMs, digital video disc (DVDs), flash drives, disks, and any other known physical storage media.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for handling a data session in a user equipment (UE), the method comprising:
    initiating a data session of at least one application from a plurality of applications with a first communication interface using a first socket of the UE including a first socket file descriptor (SOCKFD) for the data session;
    classifying the plurality of applications running on the UE as at least one of handover-sensitive applications or handover insensitive applications based on at least one of a nature of an application or a latency requirement of the application;
    based on at least one application among the plurality of applications being classified as the handover-sensitive applications, determining a communication protocol corresponding to the handover-sensitive applications;
    detecting a deterioration in a network connection of the first communication interface;
    identifying a second communication interface;
    establishing a second socket including a second SOCKFD associated with the second communication interface; and
    migrating the data session from the first communication interface to the second communication interface by mapping the first SOCKFD of the first socket to the second SOCKFD of the second socket using the determined communication protocol, wherein the data session of the at least one application is maintained continuously through a pseudo socket file descriptor during a migrating operation.

2. The method as claimed in claim 1, further comprising:
    receiving a socket establishment request from at least one application from a plurality of handover-sensitive applications on the UE;
    requesting a plurality of network resources via the first communication interface based on the received socket establishment request;
    establishing a socket including the first SOCKFD on receiving the requested plurality of network resources; and
    initiating the data session on the requested plurality of network resources by transmitting a plurality of data packets via the first socket including a first SOCKFD on the first communication interface to a network.

3. The method as claimed in claim 1, further comprising:
    detecting the first socket being used by a handover-sensitive application; and
    migrating the first socket from the first communication interface to the second communication interface.

4. The method as claimed in claim 1, further comprising performing mapping the first SOCKFD of the first socket to the second SOCKFD of the second socket on an abstract network communication layer for the data session.

5. The method as claimed in claim 1, further comprising detecting the deterioration in the network connection based on at least one of a low data throughput, a low data rate, a lost signal, a frame loss, a jitter, or a broken connectivity between the UE and a destination server.

6. The method as claimed in claim 1, further comprising transmitting, to an abstract network communication layer, a connection notification or broadcast events indicating the deterioration in the network connection.

7. The method as claimed in claim 1, further comprising:
    detecting the data session for one of a handover-sensitive application or a handover insensitive application; and
    performing at least one of:
        blocking that at least one notification is sent from a plurality of notifications based on the data session for the handover-sensitive application, or
        sending the at least one notification from the plurality of notifications based on the data session for the handover insensitive application.

8. The method as claimed in claim 7, wherein the at least one notification indicates at least one of a disconnection with the first communication interface, a new connection establishment with the second communication interface, a socket change, or a signal strength deterioration.

9. The method as claimed in claim 7, wherein the at least one notification is sent by one of the network connection, the first communication interface, the second communication interface, or lower layers of the UE.

10. The method as claimed in claim 1, further comprising:
    notifying the determined communication protocol.

11. The method as claimed in claim 10, further comprising mapping the first SOCKFD of the first socket to the second SOCKFD of the second socket based on the determined communication protocol.

12. The method as claimed in claim 10, wherein the communication protocol comprises at least one of a user datagram protocol (UDP), a transmission control protocol (TCP), or a cross-layer quick UDP internet connections (C-QUIC) protocol.

13. The method as claimed in claim 12, further comprising:
    receiving a notification from a protocol classifier of an NH4 system indicating a communication protocol to be the UDP;
    determining application data pending for a transmission on the first communication interface;
    fetching the application data from a socket buffer associated with the first socket of the UE and cloning header information of the application data; and
    mapping the cloned header information to the second socket of the UE for continuing the data session through the second communication interface.

14. The method as claimed in claim 12, further comprising:
    receiving a notification from a protocol classifier of an NH4 system indicating a communication protocol comprising the TCP; and
    continuing the data session through the pseudo socket file descriptor.

15. The method as claimed in claim 1, further comprising:
    migrating the data session back to the first communication interface upon detecting a deterioration in a network connection of the second communication interface.

16. The method as claimed in claim 1, wherein the first communication interface and the second communication interface are different communication interfaces from each other.

17. The method as claimed in claim 1, wherein the first communication interface and the second communication interface comprises at least one of a second generation (2G) network, a third generation (3G) network, a fourth generation (4G) network, a fifth generation (5G) network, a sixth generation (6G) network, or a non-3GPP network.

18. A non-transitory readable medium comprising program code, that when executed by at least one processor, causes a user equipment (UE), for handling a data session in a network handover system, to:

initiate a data session of at least one application from a plurality of applications with a first communication interface using a first socket of the UE including a first socket file descriptor (SOCKFD) for the data session;

classify the plurality of applications running on the UE as at least one of handover-sensitive applications or handover insensitive applications based on at least one of a nature of an application or a latency requirement of the application;

based on at least one application among the plurality of applications being classified as the handover-sensitive applications, determine a communication protocol corresponding to the handover-sensitive applications;

detect a deterioration in a network connection of the first communication interface;

identify a second communication interface;

establish a second socket of the UE including a second SOCKFD associated with the second communication interface; and migrate the data session from the first communication interface to the second communication interface by mapping the first SOCKFD of the first socket, to the second SOCKFD of the second socket using the determined communication protocol, wherein the data session of the at least one application is maintained continuously through a pseudo socket file descriptor during a migrating operation.

* * * * *